US010501297B2

(12) United States Patent
Wright

(10) Patent No.: US 10,501,297 B2
(45) Date of Patent: Dec. 10, 2019

(54) LOCKABLE FLOATING FORKLIFT TINE SYSTEM

(71) Applicant: DIGGA AUSTRALIA PTY LTD, Yatala, Queensland (AU)

(72) Inventor: Stewart James Wright, Brisbane (AU)

(73) Assignee: DIGGA AUSTRALIA PTY LTD, Yatala, Queensland (AU)

(*) Notice: Subject to any disclaimer, the term of this patent is extended or adjusted under 35 U.S.C. 154(b) by 0 days.

(21) Appl. No.: 15/745,973

(22) PCT Filed: Jul. 20, 2016

(86) PCT No.: PCT/AU2016/050646
§ 371 (c)(1),
(2) Date: Jan. 18, 2018

(87) PCT Pub. No.: WO2017/011874
PCT Pub. Date: Jan. 26, 2017

(65) Prior Publication Data
US 2018/0229986 A1    Aug. 16, 2018

(30) Foreign Application Priority Data

Jul. 20, 2015    (AU) ................................ 2015902871

(51) Int. Cl.
*B66F 9/14*    (2006.01)
*F16B 7/04*    (2006.01)
*F16B 2/14*    (2006.01)
(52) U.S. Cl.
CPC .............. *B66F 9/144* (2013.01); *B66F 9/142* (2013.01); *F16B 7/042* (2013.01); *F16B 2/14* (2013.01)

(58) Field of Classification Search
CPC .. B66F 9/144; B66F 9/142; B66F 9/14; B66F 9/16
See application file for complete search history.

(56) References Cited

U.S. PATENT DOCUMENTS 4,002,256 A    1/1977    Kroboth
4,497,607 A    2/1985    Johannson
(Continued)

OTHER PUBLICATIONS

International Search Report from International Patent Application No. PCT/AU2016/050646, dated Dec. 19, 2016.
(Continued)

*Primary Examiner* — Kaitlin S Joerger
(74) *Attorney, Agent, or Firm* — Greer, Burns & Crain, Ltd.

(57) ABSTRACT

A lockable floating forklift tine system including a lift carriage having at least one cross bar to mount at least one forklift tine, the at least one cross bar having a number of abutment shoulders spaced there across and at least one forklift tine having a mounting portion to mount the at least one forklift tine relative to the at least one cross bar, the mounting portion having a locking member movable relative to the mounting portion between an engaged condition in which the locking member engages at least one of the abutment shoulders preventing lateral movement relative to the at least one cross bar and a free condition in which the locking member is free of the abutment shoulders allowing the forklift tine to be moved laterally along the at least one cross bar, the locking member biased into the engaged condition.

29 Claims, 3 Drawing Sheets

(56) References Cited

U.S. PATENT DOCUMENTS

| | | | | |
|---|---|---|---|---|
| 5,033,934 | A * | 7/1991 | Emilio | B66F 9/142 |
| | | | | 414/667 |
| 5,897,288 | A | 4/1999 | Green | |
| 6,056,503 | A * | 5/2000 | Way | B66F 9/0655 |
| | | | | 414/667 |
| 6,132,164 | A * | 10/2000 | Way | B66F 9/0655 |
| | | | | 414/685 |
| 8,899,906 | B2 * | 12/2014 | Peschel | B66F 9/142 |
| | | | | 414/664 |
| 8,944,218 | B2 * | 2/2015 | Peschel | B66F 9/142 |
| | | | | 187/237 |
| 9,309,098 | B2 * | 4/2016 | Lindenmuth | B66F 9/16 |
| 2004/0086366 | A1 * | 5/2004 | Henning | B66F 9/143 |
| | | | | 414/667 |
| 2005/0123494 | A1 | 6/2005 | Chandler et al. | |
| 2010/0032243 | A1 * | 2/2010 | Heidrich | B66F 9/142 |
| | | | | 187/237 |
| 2010/0101895 | A1 | 4/2010 | Collins et al. | |
| 2010/0111647 | A1 * | 5/2010 | Noonan | A01D 87/127 |
| | | | | 414/24.5 |
| 2013/0028696 | A1 | 1/2013 | Peschel et al. | |
| 2018/0037448 | A1 * | 2/2018 | Lacher | B62B 3/06 |

OTHER PUBLICATIONS

Written Opinion from International Patent Application No. PCT/AU2016/050646, dated Dec. 19, 2016.
International Preliminary Report on Patentability from International Patent Application No. PCT/AU2016/050646, dated Jul. 4, 2017.

* cited by examiner

LOCKABLE FLOATING FORKLIFT TINE SYSTEM

BACKGROUND

The present invention relates to forklift tine systems and particularly to how the forklift tines are mounted to the cross bar of a lifting carriage.

Currently, forklift tines are either fixed or floating. Fixed forklift tines, as the designation implies, are fixed relative to the lifting carriage, in that they cannot be moved laterally relative to the cross bar, which limits their utility in picking up loads having different separation distances between the tine openings.

Floating forklift tines were developed to allow the lateral spacing of the tines to be adjusted for greater flexibility. Conventional floating forklift tines work on a relatively straightforward overcentre principle in which the forklift tine is rotated relative to the crossbar upon which it is mounted to provide small clearance between the mounting portion of the forklift tine and the crossbar, whereupon the forklift tine can be moved laterally to the required position and then released. The weight of the forklift tine, and particularly, the horizontal portion of the forklift tine will then act to hold the forklift tine in position under the influence of gravity.

Whilst floating forklift tines have found relatively wide use, the problem still exists with floating forklift tines that the forklift tines can move laterally, even when under a significant load, particularly when the forklift is moving. Generally speaking, as the forklift moves, the tines can "bounce" and this bouncing provides sufficient clearance between the mounting portion of the forklift tine and the crossbar to allow the forklift tines to move laterally.

Any undesired or unintentional lateral movement of forklift tines, particularly when a load is being moved should be avoided as it can produce unsafe conditions and/or may result in damage to the forklift tine, the crossbar or the lifting carriage of the forklift.

It will be clearly understood that, if a prior art publication is referred to herein, this reference does not constitute an admission that the publication forms part of the common general knowledge in the art in Australia or in any other country.

SUMMARY

The present invention is directed to a lockable floating forklift tine system, which may at least partially overcome at least one of the abovementioned disadvantages or provide the consumer with a useful or commercial choice.

With the foregoing in view, the present invention in one form, resides broadly in a lockable floating forklift tine system including a lift carriage having at least one cross bar to mount at least one forklift tine, the at least one cross bar having a number of abutment shoulders spaced there across and at least one forklift tine having a mounting portion to mount the at least one forklift tine relative to the at least one cross bar, the mounting portion having a locking member movable relative to the mounting portion between an engaged condition in which the locking member engages at least one of the abutment shoulders preventing lateral movement relative to the at least one cross bar and a free condition in which the locking member is free of the abutment shoulders allowing the forklift tine to be moved laterally along the at least one cross bar, the locking member biased into the engaged condition.

The lift carriage of a forklift or forklift truck is a known component of a forklift (also known as a forklift truck). According to the present invention, it is preferred that the lift carriage has a pair of side members or structures and at least one intermediate member or structure spaced from the side members, preferably an approximately centrally located member or structure. The provision of such an arrangement allows the use of two or more crossbars, but normally a pair of crossbars is provided, one for each forklift tine.

A single crossbar may be provided but a pair of crossbars is preferred. Normally, the pair of crossbars will be separated from each other by the approximately centrally located member or structure as this will act to limit movement laterally of each of the forklift tines by locating each forklift tine to either side of the approximately centrally located member or structure.

It is preferred that each of the pair of side members or structures is a unitary member, preferably a planar, plate member. Further, it is preferred that the at least one intermediate member or structure, and particularly the approximately centrally located member or structure, also be a unitary member, preferably a planar, plate member. It is preferred that each of the preferred plate members are oriented edge on relative to the the direction of travel of the forklift during normal operation, that is an edge of preferred plate members faces the direction of travel.

As mentioned above, it is preferred that a pair of cross bars is provided according to the present invention, one on either side of the preferred approximately centrally located plate member. The pair of crossbars are typically mounted coaxially with one another.

The crossbars are normally mounted between the preferred approximately centrally located plate member and the respective side member of the lift carriage.

A cross bar mounting collar is typically provided on either side of the preferred approximately centrally located plate member in order to mount the crossbar relative to the lifting carriage. A portion of the respective crossbar is normally inserted into the cross bar mounting collar and is then normally fixed therein. Although any one of a variety of mechanisms can be used to fix the portion of the crossbar within the preferred cross bar mounting collar, it is particularly preferred that an elongate fastener is provided through the cross bar mounting in order to engage with an abutment shoulder or more preferred, an opening formed into the cross bar in order to fix the position of the crossbar relative to the cross bar mounting collar.

It is further preferred that an opening is provided in the respective side member of the lifting carriage in order to receive an opposed end of the respective cross bar. A spacer or bearing may be provided relative to the opening. Preferably, the cross bar is inserted through the opening, seated in the spacer or bearing and the opposite end is seated in the cross bar mounting collar before fixing the cross bar in position. This preferred configuration will allow rotation of the cross bar if necessary but also allow the radial movement of the cross bar to be limited if necessary.

The preferred cross bar may have any shape but is preferably circular in cross-section. Each cross bar may have one or more tapered ends in order to allow easier insertion and removal of the cross bar relative to the lifting carriage.

Given that substantial load will normally be provided to the cross bar, each cross bar is preferably a solid metal bar which is sufficiently strong to bear the loads which are likely to be encountered.

Each cross bar has a number of abutment shoulders spaced there across. Normally the abutment shoulders are provided in opposed pairs in order to receive a locking member therebetween. Any number of abutment shoulders may be provided, but normally between two and seven opposed pairs of abutment shoulders are provided and five opposed pairs of abutment shoulders is a particularly preferred number.

The abutment shoulders may be provided in any form however the provision of opposed pairs of abutment shoulders is preferably created by forming a rebated portion in the preferably solid cross bar. The rebated portion will normally be smaller in diameter than the remainder of the cross bar. Preferably, the rebated portion will extend circumferentially, completely about the cross bar. The rebated portions will normally have a pair of opposed side edges forming the abutment shoulders and the side edges will normally be substantially perpendicular to the circumferential surface of the cross bar. The rebated portion will normally be provided with a base wall which is substantially parallel to the circumferential surface of the cross bar but spaced inwardly towards the axis of the cross bar.

In some forms, the rebated portions may have a stepped sidewall but normally, a single planar sidewall is provided.

The rebated portions are preferably evenly spaced across the length of the cross bar.

The lockable floating forklift tine system of the present invention also includes at least one forklift tine having a mounting portion to mount the forklift tine relative to the cross bar. As mentioned above, most forklifts include a pair of forklift tines but more than two forklift tines can be provided if necessary. If more than two forklift tines are provided, a corresponding number of cross bars are also preferably provided.

Each forklift tine of the present invention is preferably substantially L-shaped having a substantially vertical portion mounting the forklift tine relative to the respective crossbar and a substantially horizontal portion used to insert under a load, with the substantially vertical portion and substantially horizontal portion separated by a bend or heel. The forklift tines of the present invention may have any dimension in width, length and any length substantially vertical and/or substantially horizontal portion.

As mentioned above, the mounting portion is normally provided relative to the substantially vertical portion. The mounting portion of the preferred embodiment is a mounting collar. According to this preferred embodiment, the mounting collar preferably extends circumferentially about the crossbar relative to which it is mounted, forming an annular mounting collar. The preferred annular mounting collar is preferably spaced from the crossbar in order to allow the mounting collar to slide relative to the crossbar but to receive the crossbar relatively closely therein in order to minimise unwanted relative movement.

A shim or spacer or similar device may be provided within the preferred annular collar in order to allow the annular collar to slide relative to the crossbar. Where provided, any shim or spacer or similar device may be a low friction device.

It is preferred that the annular mounting collar is substantially as wide as the working face of the forklift tine but the annular mounting collar can be wider or narrower if required. The mounting collar is preferably permanently attached to the forklift tine and may be integrally formed with the forklift tine. As mentioned above, the mounting collar will preferably slide relative to the crossbar.

A locking member movable relative to the mounting portion between an engaged condition and a free condition is also preferably provided. The locking member will typically be mounted relative to the mounting portion or collar. In the most preferred embodiment, the locking member will take the form of a retractable plunger which can be retracted into the free condition, against a biasing force.

It is preferred that a portion of the locking member extend through the mounting portion. In the most preferred embodiment, an opening will normally be provided in the mounting portion. A threaded portion is preferably provided relative to the opening either within the opening or more preferred a separate, threaded body can be provided attached to an outer surface of the mounting portion with an internal threaded bore located coaxially with the opening in the mounting portion.

A plunger is normally provided with an externally threaded outer barrel or body in order to engage with the internally threaded bore to attach the plunger removably to the mounting portion. An elongate pin is provided at least partially internally of the barrel or body and an enlarged head is provided on or attached to the pin. An end of the pin opposite the enlarged head preferably extends out of the barrel of the plunger and this end of the pin will normally extend into the cross bar opening in the mounting portion of the forklift tine.

An internal shoulder is preferably provided within the outer barrel or body of the plunger in order to mount a biasing spring between the internal shoulder and a portion of the pin in order to bias the pin into the engaged or extended condition. In use, lifting the enlarged head relative to the outer barrel or body normally compresses the biasing spring and retracts the end of the pin into the body against the biasing force of the spring. Releasing the enlarged head causes the spring to return the end of the pin out of the barrel.

The locking member or retractable plunger is typically mounted on top of the mounting portion of the forklift tine, substantially parallel to the substantially vertical portion of the forklift tine. This means that the locking member or retractable plunger is substantially vertical in its normal position and also spaces the locking member or plunger from the working face of the forklift tine thereby preventing accidental damage to the locking member or retractable plunger.

As will be apparent from the configuration described, lifting the enlarged head of the plunger allows the forklift tine to be moved laterally over the crossbar and releasing the enlarged head once the pin has been moved away from an abutment shoulder will allow the pin to engage an abutment shoulder if properly located relative to an abutment shoulder or to slide along the crossbar until the pin can engage an abutment shoulder (although this is less preferred as the sliding of the pin along the crossbar may damage the crossbar).

The biased mounting of the locking member will preferably give tactile and/or audible feedback of engagement when the locking member moves into the engaged condition.

The present invention allows each forklift time to be moved independently of the other quickly and easily into a required position and then once in that position, each forklift time can be locked against lateral movement until the locking member is retracted into the free condition. In this way, the present invention provides the advantages of a floating forklift tine with the advantages of a fixed forklift tine as required or desired by a user.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION

According to a particularly preferred embodiment of the present invention, a lockable floating forklift tine system is provided.

Figures 1, 1A:
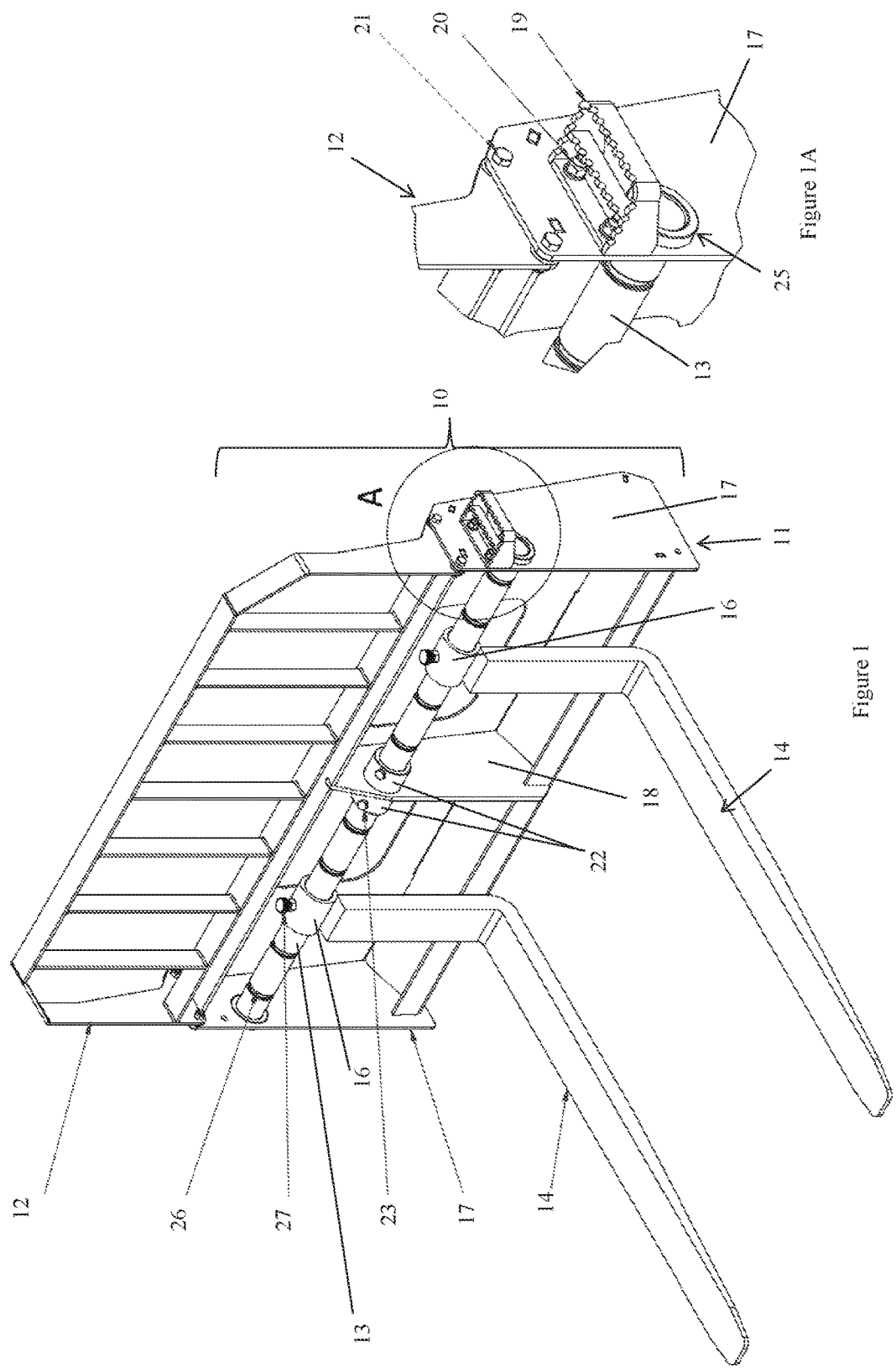
FIG. 1 is an isometric view of a lifting carriage of a forklift including a lockable floating forklift tine system according to a preferred embodiment of the present invention.
FIG. 1A is a detailed isometric view of the portion identified by reference letter "A" in FIG. 1.
Figure 2:
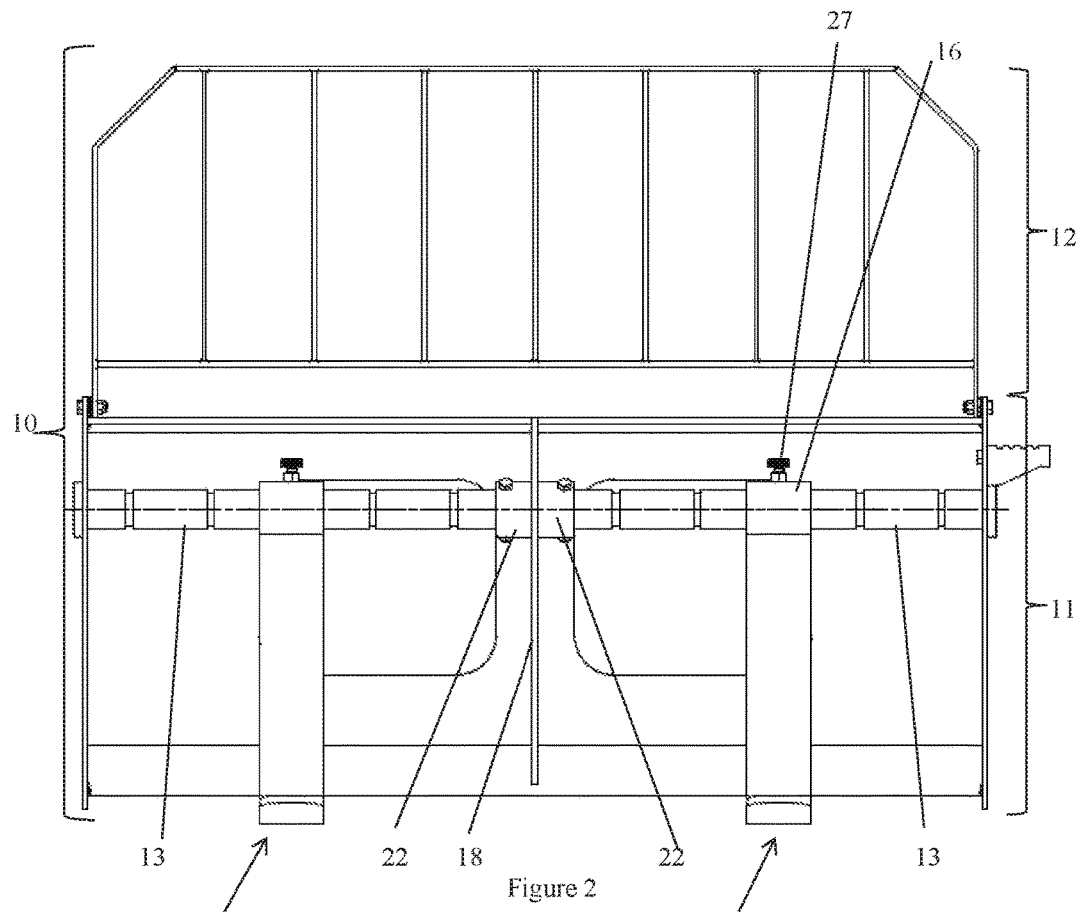
FIG. 2 is a front elevation view of the configuration illustrated in FIG. 1.
Figure 3:
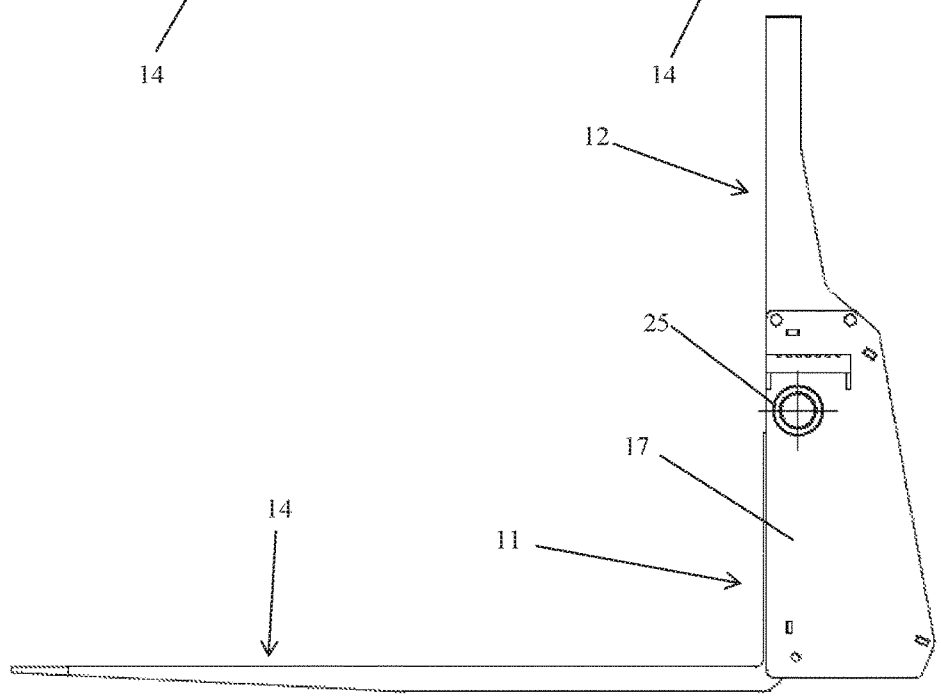
FIG. 3 is a side elevation view of the configuration illustrated in FIG. 1.

A preferred embodiment of the lockable floating forklift tine system of the invention is illustrated in FIGS. 1 to 3. The preferred embodiment of the present invention includes a lift carriage 10 comprising a lower frame 11 and an upper guard 12. The carriage 10 has a pair of cross bars 13 each mounting a forklift tine 14 relative thereto. The cross bars 13, which are illustrated in more detail in FIG. 4, each have a number of rebates 15 with abutment shoulders spaced across the cross bar 13. Each forklift tine 14 has a mounting collar 16 to mount the forklift tine 14 relative to the respective cross bar 13.

Figure 5:
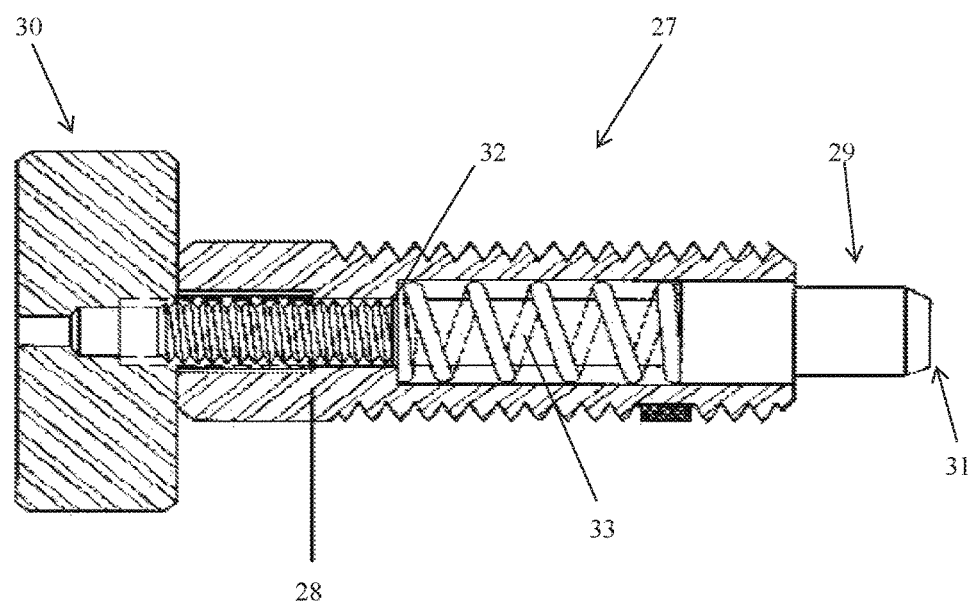
FIG. 5 is a detailed sectional view of a locking plunger assembly according to a preferred embodiment of the present invention.

Each mounting collar 16 has a retractable plunger with a locking pin which is illustrated in some detail in FIG. 5, movable relative to the mounting collar 16 between an engaged condition in which a portions the locking member is seated in a rebate and engages at least one of the abutment shoulders preventing lateral movement relative to the cross bar 13 and a free condition in which the locking member is free of the abutment shoulders allowing the forklift tine 14 to be moved laterally along the cross bar 13 with the locking member biased into the engaged condition.

The lift carriage 10 of the preferred embodiment is illustrated in FIGS. 1 to 3. The lift carriage 10 has a lower frame 11 and an upper guard 1. The lower frame 11 has a pair of side members 17 and an approximately centrally located member 18 spaced from the side members 17. The provision of such an arrangement allows the use of two crossbars 13, one for each forklift tine 14.

As illustrated, the pair of crossbars 13 are separated from each other by the centrally located member 18 as this will act to limit movement laterally of each of the forklift tines 14 by locating each forklift tine 14 to either side of the centrally located member 18.

Each of the side members 17 is a unitary, planar, plate member as is the intermediate member 18. As illustrated, each of the plate members is oriented edge on relative to the direction of travel of the forklift during normal operation, that is, an edge of plate members faces the direction of travel.

As illustrated in FIG. 1A, a step 19 can be provided attached to the lower frame 11 using a pair of nuts and bolts 20. The upper guard 12 is also attached to the lower frame 11 using a pair of nuts and bolts 21.

As mentioned above, a pair of cross bars 13 are provided in the preferred embodiment, one on either side of the centrally located plate member 18 and the crossbars 13 are mounted coaxially with one another.

A cross bar mounting collar 22 is typically provided on either side of the centrally located plate member 18 in order to mount the respective crossbar 13 relative to the lifting carriage 10. As illustrated, a portion of the respective crossbar 13 is normally inserted into the cross bar mounting collar 22 and is then normally fixed therein. Although any one of a variety of mechanisms can be used to fix the portion of the crossbar 13 within the cross bar mounting collar 22, an elongate fastener 23 is provided through the cross bar mounting collar 22 in order to engage with an opening 24 formed into the cross bar 13 in order to fix the position of the crossbar 13 relative to the cross bar mounting collar 22 as illustrated. The preferred opening 24 is illustrated more clearly in FIG. 3.

An opening 25 is also provided in the respective side member 17 of the lifting carriage 10 in order to receive an opposed end of the respective cross bar 13. A spacer or bearing may be provided relative to the opening. The cross bar 13 is normally inserted through the opening, seated in the spacer or bearing and the opposite end is seated in the cross bar mounting collar 22 before fixing the cross bar in position.

Figure 4:
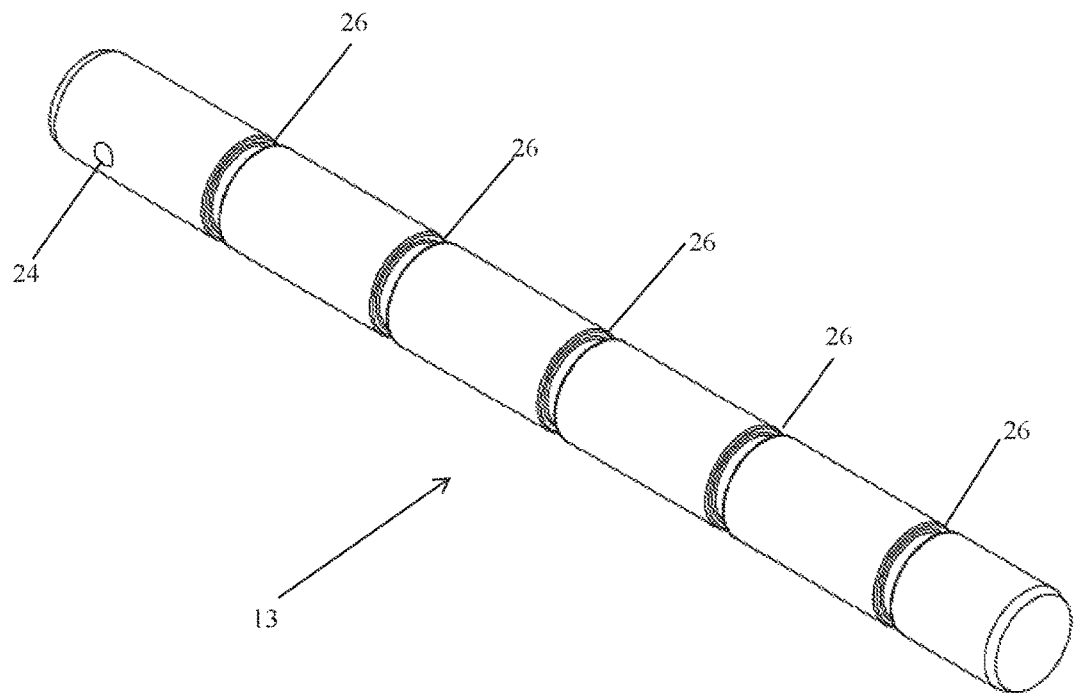
FIG. 4 is a detailed isometric view of a cross bar of a lifting carriage according to a preferred embodiment of the present invention.

The preferred cross bar 13 may have any shape but is preferably circular in cross-section as illustrated in the Figures, particularly in FIG. 4. The cross bar 13 will normally have tapered ends in order to allow easier insertion and removal of the cross bar 13 relative to the lifting carriage 10. The cross bar 13 of the preferred embodiment is a solid metal bar which is sufficiently strong to bear the loads which are likely to be encountered.

As illustrated best in FIG. 4, each cross bar 13 has a number of rebates 26 forming pairs of opposed abutment shoulders spaced there across. Any number of abutment shoulders may be provided, but normally between two and seven opposed pairs of abutment shoulders are provided and the illustrated embodiment has five opposed pairs of abutment shoulders.

The rebates 26 extend circumferentially, completely about the cross bar 13. The rebates 26 have a pair of opposed side edges forming the abutment shoulders and the side edges are substantially perpendicular to the circumferential surface of the cross bar 13. The rebates 26 have a base wall which is substantially parallel to the circumferential surface of the cross bar 13 but spaced inwardly towards the axis of the cross bar 13.

The rebate 26 are preferably evenly spaced across the length of the cross bar 13.

As mentioned above, most forklifts include a pair of forklift tines 14 but more than two forklift tines can be provided if necessary. If more than two forklift tines are provided, a corresponding number of cross bars are also preferably provided.

Each forklift tine 14 of the illustrated embodiment is substantially L-shaped having a substantially vertical portion mounting the forklift tine 14 relative to the respective crossbar 13 and a substantially horizontal portion used to insert under a load, with the substantially vertical portion and substantially horizontal portion separated by a bend or heel.

As mentioned above, the mounting collar 16 of the preferred embodiment is provided relative to the substantially vertical portion of the forklift tine 14. The mounting collar 16 extends circumferentially about the crossbar 13 relative to which it is mounted, forming an annular mounting collar. The annular mounting collar 16 is spaced from the crossbar 13 in order to allow the mounting collar 16 to slide relative to the crossbar 13 but to receive the crossbar 13 relatively closely therein in order to minimise unwanted relative movement.

The annular mounting collar 16 illustrated is substantially as wide as the working face of the forklift tine 14 but the annular mounting collar can be wider or narrower if required. The mounting collar 16 is permanently attached to the forklift tine 14 and may be integrally formed with the forklift tine.

A locking member movable relative to the mounting portion between an engaged condition and a free condition is also provided mounted relative to the mounting collar 16. In the most preferred embodiment, the locking member will take the form of a retractable plunger which can be retracted into the free condition, against a biasing force. A preferred form of retractable plunger is illustrated in FIG. 5.

One end of the locking plunger extends through the mounting collar 16. In the most preferred embodiment, an opening will normally be provided in the mounting collar 16. A threaded portion is preferably provided relative to the opening either within the opening or more preferred a separate, threaded body can be provided attached to an outer surface of the mounting portion with an internal threaded bore located coaxially with the opening in the mounting portion.

The preferred retractable plunger assembly 27 illustrated in FIG. 5 is provided with an externally threaded outer barrel 28 in order to engage with the internally threaded bore to attach the retractable plunger assembly 27 removably to the mounting collar 16. An elongate plunger pin 29 is provided at least partially internally of the barrel 28 and an enlarged head 30 is provided on or attached to the pin 29. A forward end 31 of the pin 29 opposite the enlarged head 30 extends out of the barrel 28 and this end of the pin 29 extends further inwardly than the internal surface of the mounting collar 16 of the forklift tine.

An internal shoulder 32 is provided within the outer barrel 28 in order to mount a biasing spring 33 between the internal shoulder 32 and a portion of the pin 29 in order to bias the pin 29 into the extended condition. In use, lifting the enlarged head 30 relative to the outer barrel 28 compresses the biasing spring 33 and retracts the end of the pin 29 into the body 28 against the biasing force of the spring 33. Releasing the enlarged head 30 causes the spring 33 to return the end of the pin 29 out of the barrel 28.

The retractable plunger assembly 27 of the illustrated embodiment is mounted on top of the mounting collar 16 of the forklift tine 14, substantially parallel to the substantially vertical portion of the forklift tine 14. This means that the retractable plunger assembly 27 is substantially vertical in its normal position and also spaces the retractable plunger assembly 27 from the working face of the forklift tine 14 thereby preventing accidental damage to the locking member or retractable plunger.

As will be apparent from the configuration described, lifting the enlarged head 30 of the plunger 27 allows the forklift tine 14 to be moved laterally over the crossbar 13 and releasing the enlarged head 30 once the pin 29 has been moved away from an abutment shoulder in one of the rebates 26 will allow the pin 29 to engage an abutment shoulder in a rebate 26 if properly located relative to a rebate 26 or to slide along the crossbar 13 until the pin 29 can engage a rebate 26 (although this is less preferred as the sliding of the pin along the crossbar may damage the crossbar).

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A lockable floating forklift tine system including a lift carriage having at least one cross bar to mount at least one forklift tine, the at least one cross bar having a number of abutment shoulders spaced there across and at least one forklift tine having a mounting portion to mount the at least one forklift tine relative to the at least one cross bar, the mounting portion having a locking member movable relative to the mounting portion between an engaged condition in which the locking member engages at least one of the abutment shoulders preventing lateral movement relative to the at least one cross bar and a free condition in which the locking member is free of the abutment shoulders allowing the forklift tine to be moved laterally along the at least one cross bar, the locking member biased into the engaged condition,
   wherein a cross bar mounting collar is provided on either side of an approximately centrally located plate member in order to mount the crossbar relative to the lifting carriage; and
   the number of abutment shoulders extend circumferentially completely about the at least one cross bar to facilitate floating movement of the at least one forklift tine in the engaged position.

2. The lockable floating forklift tine system as claimed in claim 1, wherein the lift carriage has a pair of side members or structures and at least one intermediate member or structure spaced from the side members.

3. The lockable floating forklift tine system as claimed in claim 2, wherein the at least one intermediate member or structure spaced from the side members comprises an approximately centrally located member or structure.

4. The lockable floating forklift tine system as claimed in claim 1, comprising a single crossbar or a pair of crossbars.

5. The lockable floating forklift tine system as claimed in claim 4, wherein the at least one intermediate member or structure spaced from the side members comprises an approximately centrally located member or structure and comprising a pair of crossbars separated from each other by the approximately centrally located member or structure.

6. The lockable floating forklift tine system as claimed in claim 2, wherein each of the pair of side members or structures is a unitary member and the at least one intermediate member or structure is a unitary member, preferably a planar, plate member.

7. The lockable floating forklift tine system as claimed in claim 2, comprising a pair of cross bars located one on either side of the at least one intermediate member or structure, the pair of crossbars being mounted coaxially with one another.

8. The lockable floating forklift tine system as claimed in claim 6, wherein the at least one intermediate member or structure comprises an approximately centrally located plate member and the crossbars are mounted between the approximately centrally located plate member and the respective side member of the lift carriage.

9. The lockable floating forklift tine system as claimed in claim 1, wherein a portion of the respective crossbar is inserted into the cross bar mounting collar and is fixed therein.

10. The lockable floating forklift tine system as claimed in claim 9, wherein an elongate fastener is provided through the cross bar mounting in order to engage with an abutment shoulder or an opening formed into the cross bar in order to fix the position of the crossbar relative to the cross bar mounting collar.

11. The lockable floating forklift tine system as claimed in claim 8, wherein an opening is provided in the respective side member of the lifting carriage in order to receive an opposed end of the respective cross bar and the cross bar is inserted through the opening, seated in a spacer or bearing and the opposite end is seated in the cross bar mounting collar before fixing the cross bar in position.

12. The lockable floating forklift tine system as claimed in claim 1, wherein the crossbar is circular in cross-section.

13. The lockable floating forklift tine system as claimed in claim 1, wherein each cross bar has one or more tapered ends in order to allow easier insertion and removal of the cross bar relative to the lifting carriage.

14. The lockable floating forklift tine system as claimed in claim 1, wherein each cross bar has a number of abutment shoulders spaced there across and the abutment shoulders are provided in opposed pairs in order to receive a locking member therebetween.

15. The lockable floating forklift tine system as claimed in claim 14, wherein between two and seven opposed pairs of abutment shoulders are provided, or five opposed pairs of abutment shoulders are provided.

16. The lockable floating forklift tine system as claimed in claim 1, wherein a plurality of opposed shoulders is provided by forming rebated portions and the rebated portions are evenly spaced across the length of the cross bar.

17. The lockable floating forklift tine system as claimed in claim 1, wherein the forklift tine is substantially L-shaped having a substantially vertical portion mounting the forklift tine relative to the respective crossbar and a substantially horizontal portion used to insert under a load, with the substantially vertical portion and substantially horizontal portion separated by a bend or heelon.

18. The lockable floating forklift tine system as claimed in claim 17, wherein the mounting portion comprises a mounting collar that extends circumferentially about the crossbar relative to which it is mounted, forming an annular mounting collar.

19. The lockable floating forklift tine system as claimed in claim 18, wherein the annular mounting collar is spaced from the crossbar in order to allow the mounting collar to slide relative to the crossbar but to receive the crossbar relatively closely therein in order to reduce unwanted relative movement.

20. The lockable floating forklift tine system as claimed in claim 18, wherein a shim or spacer is provided within the preferred annular collar in order to allow the annular collar to slide relative to the crossbar.

21. The lockable floating forklift tine system as claimed in claim 18, wherein the annular mounting collar is preferably permanently attached to the forklift tine or integrally formed with the forklift tine.

22. The lockable floating forklift tine system as claimed in claim 18, wherein a locking member movable relative to the mounting portion between an engaged condition and a free condition is provided, the locking member being mounted relative to the mounting portion or collar.

23. The lockable floating forklift tine system as claimed in claim 1, wherein the locking member comprises a retractable plunger which can be retracted into the free condition, against a biasing force.

24. The lockable floating forklift tine system as claimed in claim 1, wherein a portion of the locking member extends through the mounting portion.

25. The lockable floating forklift tine system as claimed in claim 24, wherein an opening is provided in the mounting portion and a threaded portion is provided relative to the opening either within the opening or as a separate, threaded body attached to an outer surface of the mounting portion with an internal threaded bore located coaxially with the opening in the mounting portion.

26. The lockable floating forklift tine system as claimed in claim 25, wherein a plunger is provided with an externally threaded outer barrel or body in order to engage with the internally threaded bore to attach the plunger removably to the mounting portion and an elongate pin is provided at least partially internally of the barrel or body and an enlarged head is provided on or attached to the pin, an end of the pin opposite the enlarged head extends out of the barrel of the plunger and this end of the pin will extend into the cross bar opening in the mounting portion of the forklift tine when in an engaged or extended position.

27. The lockable floating forklift tine system as claimed in claim 26, wherein an internal shoulder is provided within the outer barrel or body of the plunger in order to mount a biasing spring between the internal shoulder and a portion of the pin in order to bias the pin into the engaged or extended condition and, in use, lifting the enlarged head relative to the outer barrel or body compresses the biasing spring and retracts the end of the pin into the body against the biasing force of the spring and releasing the enlarged head causes the spring to return the end of the pin out of the barrel.

28. The lockable floating forklift tine system as claimed in claim 25, wherein the locking member or retractable plunger is mounted on top of the mounting portion of the forklift tine, substantially parallel to the substantially vertical portion of the forklift tine.

29. The lockable floating forklift tine system as claimed in claim 1, comprising two forklift tines, each forklift tine being laterally movable independently of the other quickly and easily into a required position and then once in that position, each forklift tine can be locked against lateral movement until the locking member is retracted into the free condition.

* * * * *